UNITED STATES PATENT OFFICE.

EDWARD H. RUSSELL, OF PARK CITY, UTAH TERRITORY.

PROCESS OF PURIFYING SODA-ASH.

SPECIFICATION forming part of Letters Patent No. 271,366, dated January 30, 1883.

Application filed July 17, 1882. (No specimens.)

*To all whom it may concern:*

Be it known that I, EDWARD H. RUSSELL, of Park City, in the county of Summit and Territory of Utah, have invented certain Improvements in the Process of Purifying Soda-Ash, of which the following is a specification.

My invention relates more particularly to the purifying of soda-ash or other soluble carbonate used as a precipitant for lead in the leaching of ores by means of a hyposulphite.

In the ordinary process of leaching by a hyposulphite the hyposulphite solution is allowed to pass through the ore, whereby certain compounds of lead, silver, copper, and gold are dissolved, after which they are precipitated together as sulphides. The resulting bullion is usually of a very base character. In an application for a patent heretofore filed I have described a method of precipitating lead by itself as a carbonate, the other materials being precipitated together, by themselves, according to the usual method. As a precipitant for the lead I use soda-ash. In practice I have found that it usually contains a small percentage of impurity—probably sodium sulphide—which causes a small amount of the silver in the hyposulphite solution to be precipitated along with the carbonate of lead.

The object of the present invention is to purify the soda-ash solution previous to using it, so that no silver shall be precipitated with the lead. Instead, therefore, of using an aqueous solution of soda-ash as a precipitant for the lead, I use a solution which contains a substance with which the sodium sulphide or other impurity will unite. A solid is thus formed, which settles to the bottom, and the clear solution can then be used as a precipitant for the lead without danger of precipitating any portion of the silver therewith. The substance I use is sulphate of copper or any other cheap and soluble compound of copper. Were the copper sulphate added to an aqueous solution of soda-ash, the copper would be precipitated as a carbonate; but by dissolving the soda-ash in water containing hyposulphite of soda or potash, and then adding the copper sulphate, the copper is prevented from uniting with the carbon of the soda-ash, and is left free to attack the sulphur of the sodium sulphide or other impurities of soda-ash.

In preparing my soda-ash solution for practice I use generally from two hundred to five hundred parts of soda-ash, from fifty to one hundred parts of hyposulphite of soda, and from one to five parts of copper salt; but these proportions may be departed from to some extent, according to the quality or character of the material.

Having thus described my invention, what I claim is—

1. The herein-described process of purifying soda-ash, consisting in combining therewith a solution containing sulphate of copper or equivalent soluble compound of copper.

2. The process of removing sodium sulphide from sodium carbonate, consisting in dissolving the latter in water containing hyposulphite of soda or potash and adding sulphate of copper.

EDWARD HUBBARD RUSSELL.

Witnesses:
WALTER AHNY,
GEO. P. THORNTON.